(12) United States Patent
Niu

(10) Patent No.: US 10,521,637 B2
(45) Date of Patent: Dec. 31, 2019

(54) PASSWORD INPUT KEYBOARD, ANTI-THIEF AND UNLOCKING METHOD AND ATM

(71) Applicants: BOE Technology Group Co., Ltd., Beijing (CN); Beijing BOE Chatani Electronics Co., Ltd., Beijing (CN)

(72) Inventor: Zirui Niu, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 1202 days.

(21) Appl. No.: 14/800,964

(22) Filed: Jul. 16, 2015

(65) Prior Publication Data

US 2016/0210624 A1 Jul. 21, 2016

(30) Foreign Application Priority Data

Jan. 21, 2015 (CN) .......................... 2015 1 0030381

(51) Int. Cl.
*G06K 9/00* (2006.01)
*G07F 19/00* (2006.01)
(Continued)

(52) U.S. Cl.
CPC ......... *G06K 9/00013* (2013.01); *G06F 3/021* (2013.01); *G06F 3/0219* (2013.01);
(Continued)

(58) Field of Classification Search
CPC ........... G06K 9/00013; G06K 9/00006; G06K 9/00892; G06F 3/021; G06F 3/0219; G06Q 20/40145; G07F 19/201
(Continued)

(56) References Cited

U.S. PATENT DOCUMENTS 6,337,918 B1 * 1/2002 Holehan ............... G06F 1/1616
345/175
7,079,833 B2 7/2006 Ohba
(Continued)

FOREIGN PATENT DOCUMENTS

CN 1385981 A 12/2002
CN 101065755 A 10/2007
(Continued)

OTHER PUBLICATIONS

First Office Action, including Search Report, for Chinese Patent Application No. 201510030381.2, dated Mar. 3, 2017, 14 pages.
(Continued)

*Primary Examiner* — James D Nigh
(74) *Attorney, Agent, or Firm* — Westman, Champlin & Koehler, P.A.

(57) ABSTRACT

Embodiments of the invention disclose a password input keyboard. The password input keyboard comprises: at one touch screen configured to receive a password input by a user's finger; a password verifying module configured to determine whether the password received by the touch screen is the same as a preset password stored in a bank; at least one fingerprint recognizer located at a side of the touch screen opposite to the side of the touch screen being touched by the user's finger and configured to extract a fingerprint feature of the user's finger when the password is input through the touch screen by the user's finger; a fingerprint verifying module configured to determine whether the fingerprint feature extracted by the fingerprint recognizer is the same as a preset fingerprint feature stored in the bank; and an unlocking and controlling module configured to obtain determination results from the password verifying module and the fingerprint verifying module and operate a locked device that is associated with the password input keyboard.

4 Claims, 4 Drawing Sheets

(51) Int. Cl.
  *G06Q 20/40* (2012.01)
  *G06F 3/02* (2006.01)
  *G06F 21/32* (2013.01)
(52) U.S. Cl.
  CPC ......... *G06F 21/32* (2013.01); *G06K 9/00006* (2013.01); *G06K 9/00892* (2013.01); *G06Q 20/40145* (2013.01); *G07F 19/201* (2013.01)
(58) Field of Classification Search
  USPC .......................................................... 705/50
  See application file for complete search history.

(56) References Cited

U.S. PATENT DOCUMENTS

| | | | |
|---|---|---|---|
| 8,332,933 | B2 | 12/2012 | Ogo et al. |
| 8,508,340 | B2 | 8/2013 | Sanchez Sanchez et al. |
| 9,519,771 | B2 | 12/2016 | Fadell et al. |
| 9,570,002 | B2 * | 2/2017 | Sakariya ............... G06F 3/0412 |
| 10,126,858 | B2 * | 11/2018 | Li ........................ G06F 3/0416 |
| 2005/0264472 | A1 * | 12/2005 | Rast .......................... G09G 3/14 345/30 |
| 2009/0083847 | A1 * | 3/2009 | Fadell .................... G06F 21/316 726/16 |
| 2010/0245288 | A1 * | 9/2010 | Harris .................... G06F 3/0421 345/175 |
| 2015/0014141 | A1 * | 1/2015 | Rao ....................... G06K 9/0002 200/600 |

FOREIGN PATENT DOCUMENTS

| | | |
|---|---|---|
| CN | 201181501 Y | 1/2009 |
| CN | 101448056 A | 6/2009 |
| CN | 101809581 A | 8/2010 |
| CN | 201667099 U | 12/2010 |

OTHER PUBLICATIONS

Second Office Action, including Search Report, for Chinese Patent Application No. 201510030381.2, dated Aug. 7, 2017, 15 pages.

* cited by examiner

PASSWORD INPUT KEYBOARD, ANTI-THIEF AND UNLOCKING METHOD AND ATM

CROSS-REFERENCE TO RELATED APPLICATION

This application claims the benefit of Chinese Patent Application No. 201510030381.2 filed on Jan. 21, 2015 in the State Intellectual Property Office of China, whole disclosure of which is incorporated herein by reference.

BACKGROUND OF THE INVENTION

Field of the Invention

The present invention relates to anti-thief technology, and especially to a password input keyboard, an anti-thief and unlocking method, and an Automatic Teller Machine (ATM).

Description of the Related Art

Presently, a common anti-thief means in ATMs is using passwords. That is, a user presets a password at a bank's counter, and if the user operates on an ATM, for example, to draw money or to transfer accounts, only when a password input through a keyboard is the same as the password preset at the bank, the ATM will be unlocked.

However, current password input keyboards of ATMs have bad security, when users operate on an ATM, the operations can be influenced by surrounding environment and passwords can thereby be leaked. For example, a password can be maliciously peeped, and a great loss in property can be occurred.

SUMMARY OF THE INVENTION

The present invention has been made to overcome or alleviate at least one aspect of the above mentioned disadvantages.

Accordingly, it is an object of the present invention to provide a password input keyboard, an anti-thief and unlocking method and an ATM.

According to an aspect of the present invention, there is provided a password input keyboard.

In an exemplary embodiment, the password input keyboard comprises:

at one touch screen configured to receive a password input by a user's finger;

a password verifying module configured to determine whether the password received by the touch screen is the same as a preset password stored in a bank;

at least one fingerprint recognizer located at a side of the touch screen opposite to the side of the touch screen being touched by the user's finger and configured to extract a fingerprint feature of the user's finger when the password is input through the touch screen by the user's finger;

a fingerprint verifying module configured to determine whether the fingerprint feature extracted by the fingerprint recognizer is the same as a preset fingerprint feature stored in the bank; and an unlocking and controlling module configured to obtain determination results from the password verifying module and the fingerprint verifying module and operate a locked device that is associated with the password input keyboard.

According to another aspect of the present invention, there is provided an anti-thief and unlocking method.

In an exemplary embodiment, the anti-thief and unlocking method comprises steps of:

acquiring a password input by a user, and determining whether the password is the same as a preset password stored in a bank;

extracting a fingerprint feature of the user when the user inputs the password with a finger, and determining whether the fingerprint feature is the same as a preset fingerprint feature stored in the bank; and unlocking a locked device when the inputted password is the same as the preset password stored in a bank and the extracted fingerprint feature is the same as the preset fingerprint feature stored in the bank, and keeping the locked device in the locked state when the inputted password is different from the preset password stored in the bank and/or the extracted fingerprint feature is different from the preset fingerprint feature stored in the bank.

According to a further aspect of the present invention, there is provided an ATM.

In an exemplary embodiment, the ATM comprises a password input keyboard described above.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
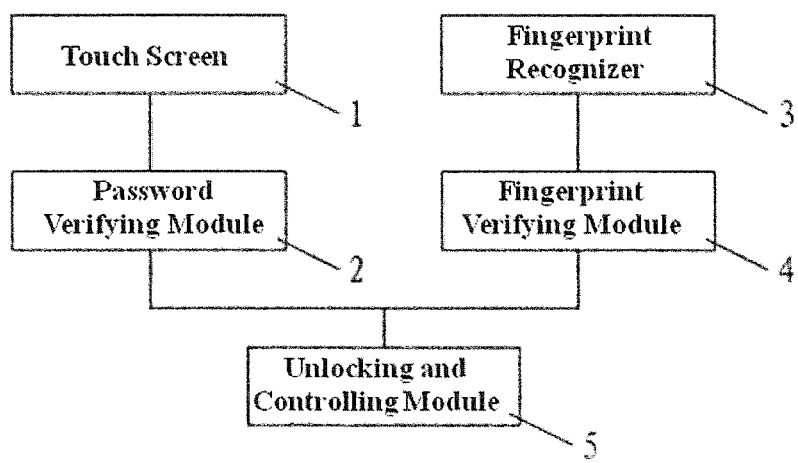
FIG. 1 is an illustrative structural drawing showing a password input keyboard according to a first embodiment of the present invention.
Figure 2:
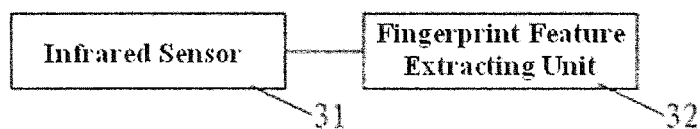
FIG. 2 is an illustrative structural drawing showing fingerprint recognizer of the password input keyboard according to the first embodiment of the present invention.

Exemplary embodiments of the present disclosure will be described hereinafter in detail with reference to the attached drawings, wherein the like reference numerals refer to the like elements. The present disclosure may, however, be embodied in many different foul's and should not be construed as being limited to the embodiment set forth herein; rather, these embodiments are provided so that the present disclosure will be thorough and complete, and will fully convey the concept of the disclosure to those skilled in the art.

First Embodiment

Figure 3:
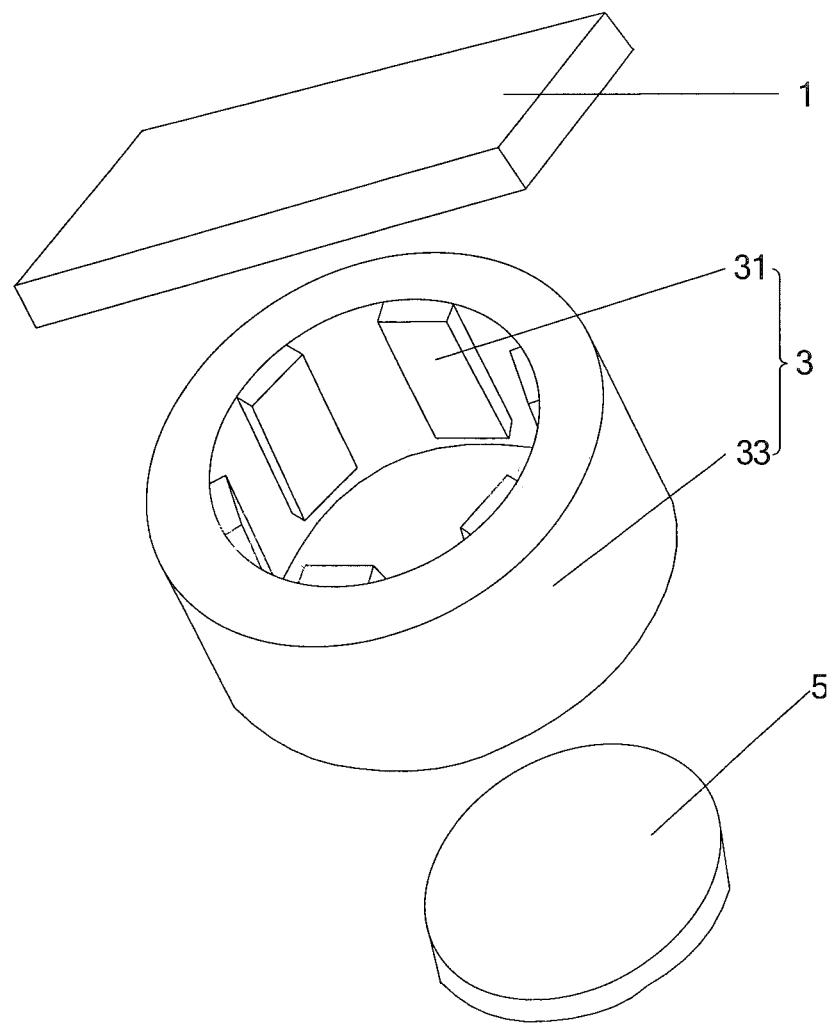
FIG. 3 is an illustrative structural drawing showing the components under a button of the password input keyboard according to the first embodiment of the present invention.

The first embodiment provides a password input keyboard. As shown in FIGS. 1 and 3, the password input keyboard comprises: at one touch screen 1 configured to receive a password input by a user's finger; a password verifying module 2 configured to determine whether the password received by the touch screen 1 is the same as a preset password stored in a bank; at least one fingerprint recognizer 3 located at a side of the touch screen 1 opposite to the side of the touch screen 1 being touched by the user's finger and configured to extract a fingerprint feature of the user's finger when the password is input through the touch screen by the user's finger; a fingerprint verifying module 4 configured to determine whether the fingerprint feature extracted by the fingerprint recognizer 3 is the same as a preset fingerprint feature stored in the bank; and an unlocking and controlling module 5 configured to obtain determination results from the password verifying module 2 and the fingerprint verifying module 4 and operate a locked device that is associated with the password input keyboard According to an example, the touch screen 1 comprises a plurality of touch regions configured to receive the password input by the user's finger, and the password input keyboard comprises a plurality of fingerprint recognizers 3, each of the fingerprint recognizers 3 is associated with one corresponding touch region.

According to an alternative example, the password input keyboard comprises a plurality of touch screens 1 configured to receive the password input by the user's finger, and the password input keyboard comprises a plurality of fingerprint recognizers 3, each of the fingerprint recognizers 3 is associated with one corresponding touch screen 1.

With the above configurations of the password input keyboard, the password input keyboard according to the embodiment will unlock the locked device associated therewith only when the input password is the same as the preset password stored in the bank and the fingerprint feature of the finger pressed on the touch buttons is the same as the preset fingerprint feature stored in the bank, and the password input keyboard will keep the device locked in any other events. Therefore, the password input keyboard according the embodiment has two anti-thief functions provided by password and fingerprint, improves the security of the password input keyboard, efficiently prevents losses of property inside the device associated with the password input keyboard and information leakage, and protects body and property safety of users.

The password input keyboard according to the embodiment uses touch screen(s), for example, transparent touch screen(s), as keyboard buttons. Therefore, when a finger is pressed on a touch button, the fingerprint recognizer 3 can sense fingerprint ridges of the finger that makes the touch action and extract a fingerprint feature. In one example, the touch screen 1 is a capacitive touch screen, and each touch button of the touch screen 1 may have a patterned electrode in shape of, for example, a number selected from 0 to 9, "*", "#", or the like. The password input keyboard only need to detect whether there is a touch action at a location corresponding to each of the numbers.

It is to be noted that FIG. 3 only shows the configuration of the components at one touch button, and configurations at every other touch buttons is similar as that shown in FIG. 3. The only difference is the information represented by buttons, which is a number selected from 0 to 9, "*", "#", or the like.

In the present embodiment, each fingerprint recognizer 3 may comprises: at least one infrared sensor 31 configured to scan the fingerprint of the user's finger pressed on the touch screen 1 or on a touch region of the touch screen 1 and generate a fingerprint image; and a fingerprint feature extracting unit 32 configured to extract a fingerprint feature from the fingerprint image. Specifically, the infrared sensor 31 is used to emit infrared light to scan the fingerprint of the user's finger pressed on the touch screen 1 or on a touch region of the touch screen 1 and generate a fingerprint image. A feasible solution is that, when a user's finger touches a transparent touch panel (the touch is usually accompanied with a press action), the infrared sensor 31 operates and emits infrared light to perform a scan based photographing and the fingerprint feature extracting unit 32 obtains the fingerprint image, processes the fingerprint image and extracts the fingerprint feature from the fingerprint image.

The number of the infrared sensor 31 comprised in each fingerprint recognizer 3 is not limited herein. In one example, the number of the infrared sensors may be in a range from 4 to 8, so that a scan area can cover all regions of the fingerprint and thereby ensure a relative high accuracy of the scan. In a further example, the number is 6 so that the number is not too much and at the same time the accuracy of the scan can be maintained at a high level.

In one example, in order to improve integrality of the password input keyboard and simplify the structure thereof, each fingerprint recognizer 3 may further comprise a ring-shaped supporting component 33, and a plurality of infrared sensors 31 are disposed on an inner circumferential wall of the supporting component 33.

The supporting component 33 may also be configured to receive internal circuits, such as a wire connecting the fingerprint recognizer 3 and the unlocking and controlling module 5 and the like, of the password input keyboard, so as to decrease interferes between different circuits and interferes between circuits and components and to improve security of the password input keyboard.

In one example, the fingerprint feature extracting unit 32 is disposed on an end surface of the supporting component 33 facing the touch screen 1, so as to acquire the fingerprint image from the infrared sensor 31 rapidly and efficiently. In one example, the fingerprint verifying module 4 may be located at a side of the supporting component 33 away from the touch screen 1, so as to avoid an unnecessary blocking scan of the infrared sensor 31.

In the present embodiment, the password verifying module 2, the fingerprint verifying module 4 and the unlocking and controlling module 5 may be integrated to improve integrality of the password input keyboard.

Second Embodiment

Based on the first embodiment, the second embodiment provides an anti-thief and unlocking method that may be applied to the password input keyboard according to the first embodiment.

Figure 4:
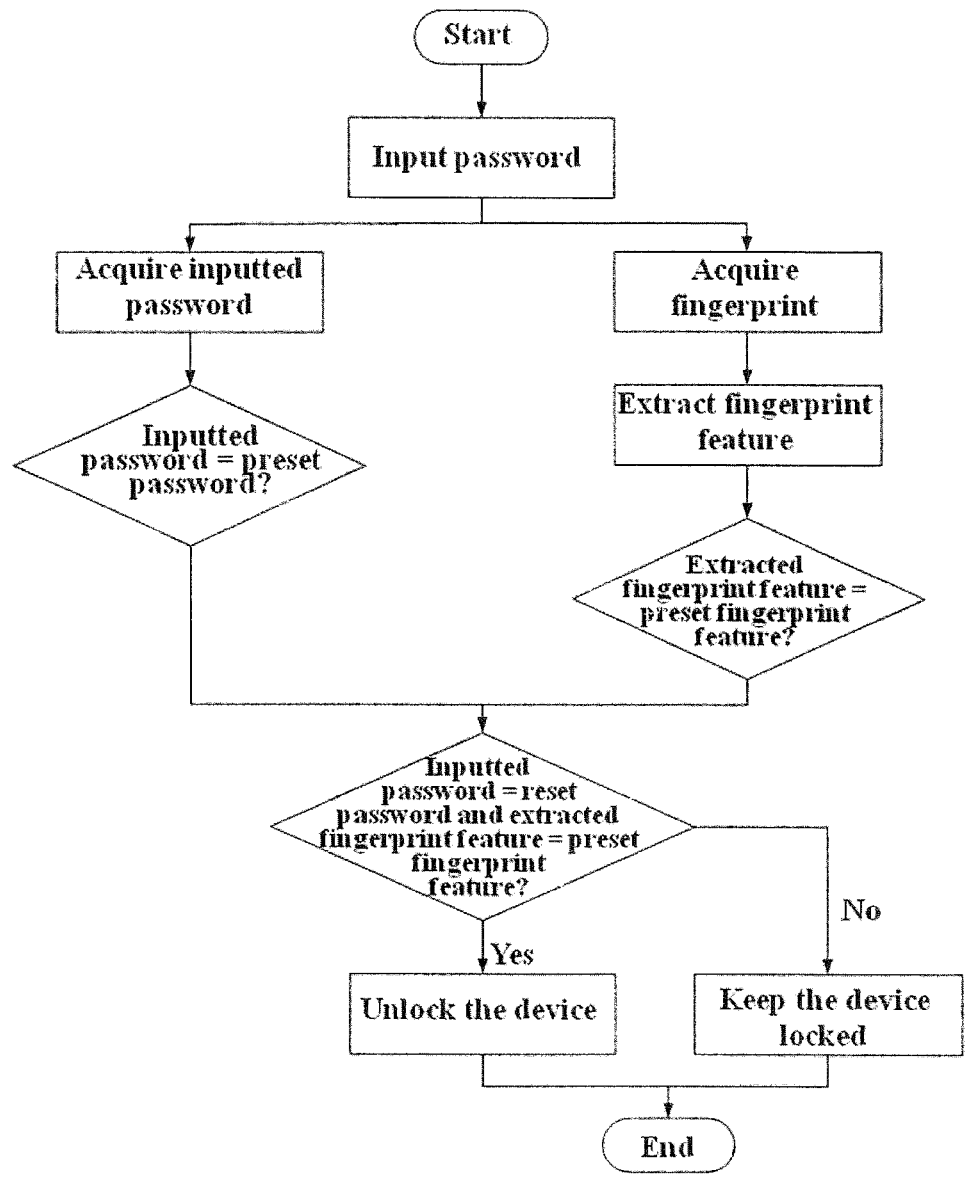
FIG. 4 is an illustrative flow chart showing an anti-thief and unlocking method according to a second embodiment of the present invention.

As shown in FIG. 4, the anti-thief and unlocking method comprise steps of: acquiring a password input by a user, and determining whether the password is the same as a preset password stored in a bank; extracting a fingerprint feature of the user when the user inputs the password with a finger, and determining whether the fingerprint feature is the same as a preset fingerprint feature stored in the bank; and determining the user's identity based on the results of the determining concerning password and the determining concerning fingerprint. Different operations may be performed based on the user's identity. For example, when the method is applied to an ATM, an inputted password is the same as a preset password stored in a bank and an extracted fingerprint feature is the same as a preset fingerprint feature stored in the bank, it is determined that the current user is a specific user, then a device inside the ATM can be unlocked and the user can operates the ATM normally. When the inputted password is different from the preset password stored in the bank and/or the extracted fingerprint feature is different from the preset fingerprint feature stored in the bank, it is determined that the current user is not the specific user, then the device is maintained in a locked state, such that the user can not operates the ATM normally.

According to the anti-thief and unlocking method provided by the present embodiment, the locked device will be unlocked only when the input password is the same as the preset password stored in the bank and the fingerprint of the finger pressed on the touch buttons is the same as the preset fingerprint stored in the bank, and the device will be kept locked in any other events. Therefore, the method according the embodiment has greatly improved security of the device in contrast with the method in prior art which depends only on passwords.

In the present embodiment, the step of extracting a fingerprint feature of the user when the user inputs the password with a finger may specifically comprise: scanning the fingerprint of the user's finger with infrared light and generating a fingerprint image; and processing the fingerprint image and extracting a fingerprint feature of the user's finger. The above technical solution of extracting the fingerprint feature is simpler and can be carried out easily.

Figure 5:
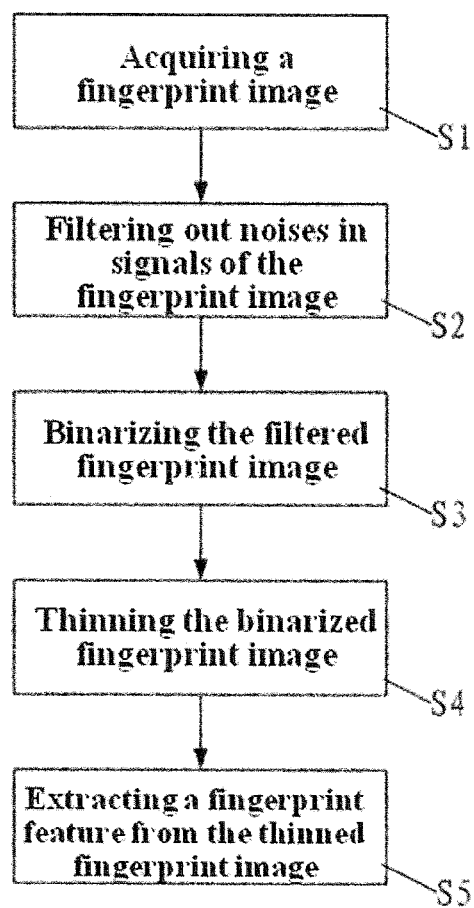
FIG. 5 is an exemplary detailed flow chart showing the steps of the anti-thief and unlocking method according to the second embodiment of the present invention.

In one example, as shown in FIG. 5, the step of processing the fingerprint image and extracting a fingerprint feature of the user's finger comprises the following steps of:

Step S1: acquiring a fingerprint image;
Step S2: filtering out noises in signals of the fingerprint image;
Step S3: binarizing the filtered fingerprint image;
Step S4: thinning the binarized fingerprint image; and
Step S5: extracting a fingerprint feature from the thinned fingerprint image.

With the above steps S1 to S5, a legible fingerprint feature can be extracted and accuracy of a fingerprint verifying that follows can thereby be ensured.

Third Embodiment

Based on the first embodiment and the second embodiment, the third embodiment provides an ATM comprising a password input keyboard according to the first embodiment. Since the password input keyboard according to the first embodiment has two anti-thief functions provided by password and fingerprint, the ATM can be operated to, for example, draw money, transfer accounts and the like only when both password validation and fingerprint validation are passed, so that body safety and property safety of users can be ensured.

In one example, the ATM according to the third embodiment may be further provided with another anti-thief function. Specifically, in a predetermined time period, if a situation in which an inputted wrong password is different from the preset password stored in the bank and/or an extracted fingerprint is different from the preset fingerprint stored in the bank has occurred for several times (for example, 3 times), the ATM will retain an associated credit card or freeze an associated account, so that user's property safety is further improved.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A password input keyboard, comprising:
At least one transparent touch screen configured to receive a password input by a user's finger; and
at least one fingerprint recognizer located at a second side of the touch screen opposite to a first side of the touch screen, the first side of the touch screen being touched by the user's finger, each fingerprint recognizer comprising:
a ring-shaped supporting component; and
a plurality of infrared sensors on an inner circumferential wall of the supporting component, the infrared sensors being configured to scan a fingerprint of the user's finger pressed on the touch screen and generate a fingerprint image;
wherein the password input keyboard is configured to:
determine whether the password received by the touch screen is the same as a preset password;
extract a fingerprint feature of the user's finger from the fingerprint image when the password is input through the touch screen by the user's finger;
determine whether the fingerprint feature is the same as a preset fingerprint feature; and
unlock a locked device that is associated with the password input keyboard, when both the password received by the touch screen is the same as the preset password and the fingerprint feature is the same as the preset fingerprint feature.

2. The password input keyboard according to claim 1, wherein the number of the infrared sensors is in a range from 4 to 8.

3. The password input keyboard according to claim 1, wherein the touch screen comprises a plurality of touch regions configured to receive the password input by the user's finger.

4. The password input keyboard according to claim 3, wherein the password input keyboard comprises a plurality of fingerprint recognizers, each of the fingerprint recognizers being associated with one corresponding touch region.

* * * * *